United States Patent

Leivan

Patent Number: 5,383,586
Date of Patent: Jan. 24, 1995

[54] PULL OUT CUP AND CAN HOLDER

[76] Inventor: Wayne L. Leivan, 19911 Edgewood La., Huntington Beach, Calif. 92649

[21] Appl. No.: 131,284

[22] Filed: Oct. 4, 1993

[51] Int. Cl.⁶ .............................. B60R 7/06; B60R 7/00
[52] U.S. Cl. ................... 224/42.44; 224/281; 248/311.2; 206/563; 211/74
[58] Field of Search ............... 224/42.43, 42.44, 281, 224/282, 42.32, 42.42; 108/25, 26; 248/558, 311.2; 296/37.12, 37.15; 211/74, 78, 88, 153, 94; 206/562, 563

[56] References Cited

U.S. PATENT DOCUMENTS

| | | | |
|---|---|---|---|
| 1,997,220 | 4/1935 | Killgore | 211/153 |
| 2,014,745 | 9/1935 | Regli | 206/562 |
| 2,510,545 | 6/1950 | Brabham | 224/42.44 |
| 3,163,287 | 12/1964 | Barnett | 206/563 |
| 3,184,071 | 5/1965 | Delaire | 211/74 |
| 3,334,954 | 8/1967 | Kesling | 211/153 |
| 3,899,982 | 8/1975 | Fetzek | 108/25 |
| 4,792,174 | 12/1988 | Shioda | 296/37.12 |
| 4,826,058 | 5/1989 | Nakayama | 224/42.44 |
| 4,927,024 | 5/1990 | Lloyd | 206/562 |
| 4,947,991 | 8/1990 | Snell | 206/562 |
| 4,953,771 | 9/1990 | Fischer et al. | |
| 4,981,277 | 1/1991 | Elwell . | |
| 5,024,411 | 6/1991 | Elwell . | |
| 5,052,728 | 10/1991 | Fukumoto | 224/281 |
| 5,060,899 | 10/1991 | Lorence et al. | 248/311.2 |
| 5,096,152 | 3/1992 | Christiansen et al. | |
| 5,171,061 | 12/1992 | Marcusen . | |
| 5,195,711 | 3/1993 | Miller et al. . | |
| 5,228,611 | 7/1993 | Yabuya | 224/281 |
| 5,259,519 | 11/1993 | Lieberman | 211/94 |
| 5,297,709 | 3/1994 | Dykstra et al. | 224/42.44 |

FOREIGN PATENT DOCUMENTS 463306  1/1992  European Pat. Off. ......... 224/42.44

Primary Examiner—Henry J. Recla
Assistant Examiner—Gregory M. Vidovich
Attorney, Agent, or Firm—Hawes & Fischer

[57] ABSTRACT

A pull out cup and can holder to receive and restrain a coffee cup or a beverage can at respective first and second openings formed through first and opposite ends of the holder. The cup and can holder is slidably received in and removable from a frame that is mounted below a suitable flat surface of a vehicle (e.g. a boat, and the like) that is subjected to turbulence and other mechanical forces during operation. The cup and can holder may be partially removed from the frame to expose either the first or second opening at the forward end thereof for receiving and restraining either a cup or a can. The cup and can holder may also be completely removed from the frame to be rotated by 180 degrees and then returned to the frame so that the first or second opening may be relocated to the forward end whereby to receive and restrain the beverage container of the user's choice.

8 Claims, 3 Drawing Sheets

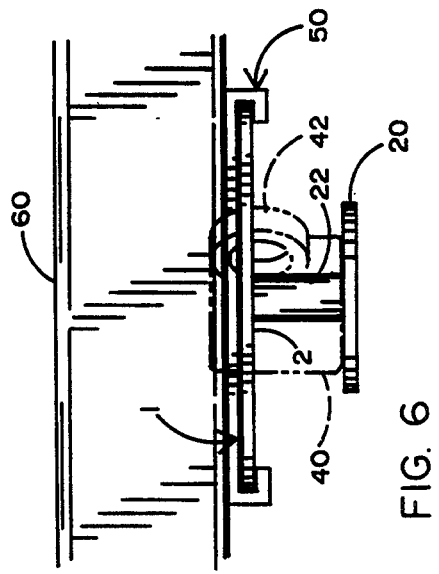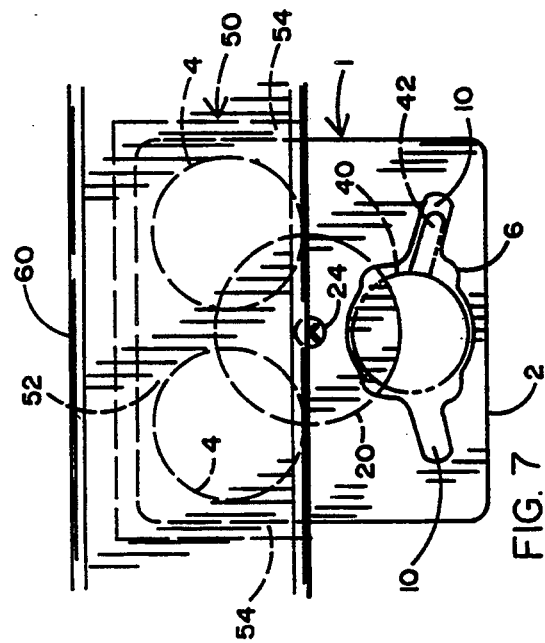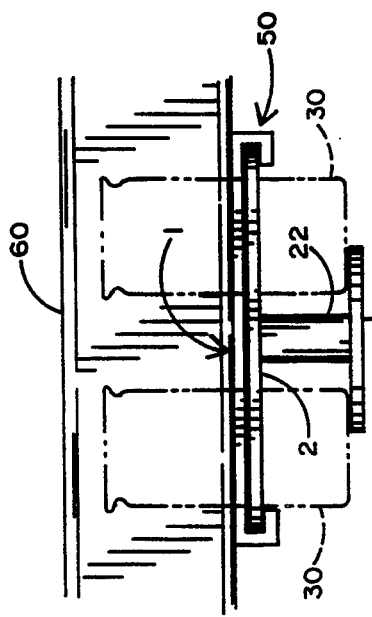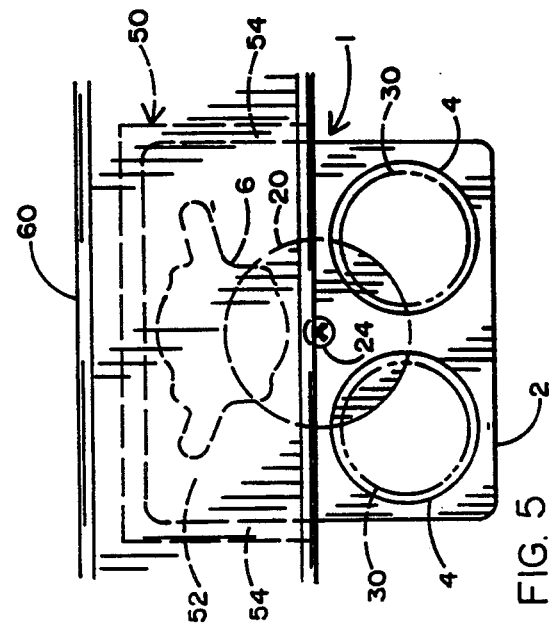

PULL OUT CUP AND CAN HOLDER

BACKGROUND OF THE INVENTION

1. Field of the Invention

This invention relates to a pull out cup and can holder to receive and retain a coffee cup and a beverage can at first and second sets of openings formed through first and opposite ends of the holder. The cup and can holder is particularly useful in moving vehicles (e.g. boats, and the like) where it is necessary to restrain cups and cans that are subjected to turbulence and other mechanical forces during operation of the vehicle.

2. Background Art

A passenger in a moving vehicle sometimes finds it desirable to have access to a beverage. During certain occasions, a hot beverage such as coffee, tea or soup is desired. On other occasions, a cold beverage such as a soft drink or beer may be desired. However, in the case where the vehicle is subjected to turbulence, a cup or beverage container placed on a table or other flat surface may be susceptible to movement, whereby the fluid contents are spilled. By way of example, both power boats and sail boats experience pitching, turning and other mechanical forces that are caused by interaction with the elements. With nothing to restrain a beverage container against movement, the forces transmitted to the boat will typically cause the container to slide or roll away from the user, such that the container may even fall off the surface on which it has been placed.

Hot and cold beverages are usually drunk from containers of different sizes and shapes. For example, a cold beverage is often stored in an aluminum can and a hot beverage is poured into a cup or mug. Vehicle mounted cup and can holders have been known in the past. However, many conventional holders are adapted to retain either cups or cans of a single size. Consequently, the flexibility and desirability of these holders are limited because the user will not have ready access to both hot and cold beverage containers of different sizes. Other cup and can holders are relatively complex so as to be characterized by high manufacturing cost and the need to make alterations to the surface on which they are mounted.

It would therefore be desirable to have available a relatively low cost, easy to use cup and can holder that will restrain cups and cans of different sizes and be installed below almost any flat mounting surface without the requirement of making substantial alterations to the surface.

SUMMARY OF THE INVENTION

A pull out cup and can holder is disclosed to receive and restrain beverage cans and cups carrying cold and hot beverages, respectively. The cup and can holder is suitable for use in a moving vehicle (e.g. a boat, and the like) which is subjected to turbulence and other mechanical forces during operation. By virtue of the foregoing, it is possible to stabilize the cup or can against movement and thereby avoid the possibility that the beverage carried thereby will be spilled.

The cup and can holder of the present invention includes a flat base plate. A pair of round holes are formed through a first end of the base plate to receive beverage cans therein, and an opening is formed through the opposite end of the base plate to receive a cup therein. Located below and spaced downwardly from the bottom of the base plate is a rest. The rest is located underneath at least some portion of each of the holes and the opening formed through the base plate so as to block the cans and cup received in the holes or opening from falling completely therethrough.

A frame having a pair of inwardly turned guide lips is mounted under a suitable flat surface of the vehicle. The base plate is slidably received by the guide lips of the frame so that the base plate can be moved inwardly to an out-of-the-way location below the flat surface. The base plate may be pulled partially out of the frame when it is desirable to place a can or a cup in a hole or the opening that is disposed through the forward end of the base plate. The base plate may be pulled completely out of the frame, rotated by 180 degrees, and then returned to the frame so that the holes or opening located at the rearward end of the base plate will be relocated to the forward end as is necessary to receive and retain the beverage container of the user's choice.

BRIEF DESCRIPTION OF THE DRAWINGS

FIG. 4 is a front view of the base plate pulled partially out of its frame for receiving cans;

FIG. 5 is a top view of the base plate and frame of FIG. 4;

FIG. 6 is a front view of the base plate pulled partially out of its frame for receiving a cup; and FIG. 7 is a top view of the base plate and frame of FIG. 6.

DETAILED DESCRIPTION

Figure 1:
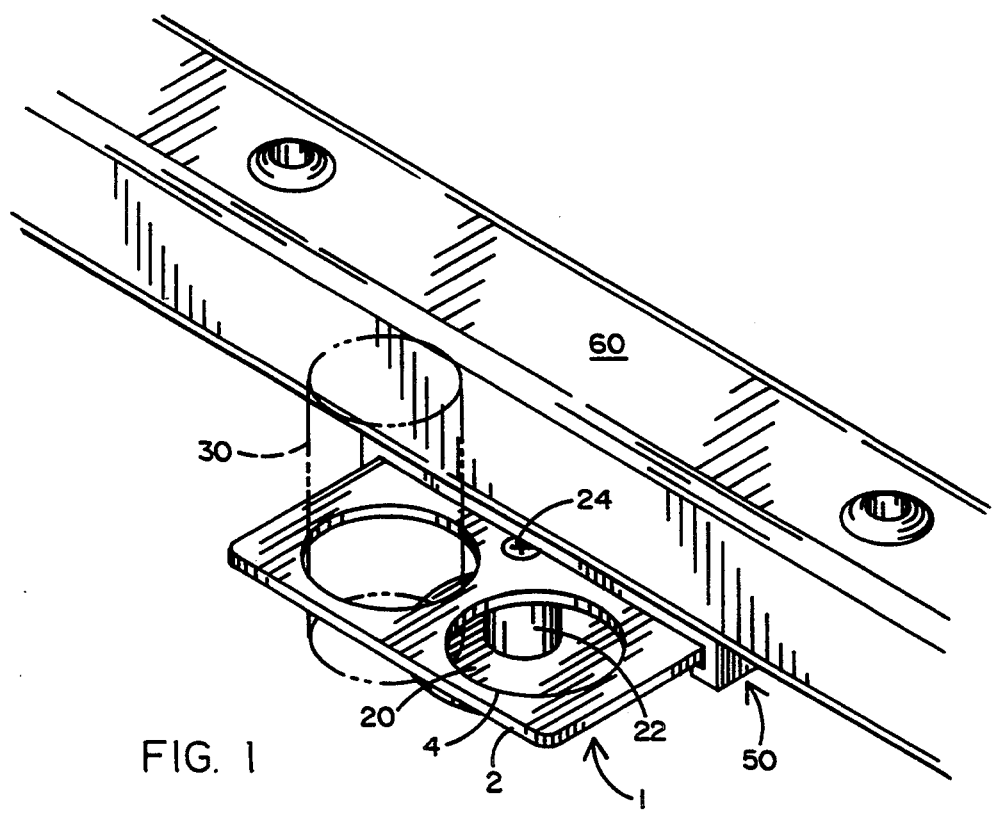
FIG. 1 is a perspective view of a base plate of the cup and can holder of the present invention pulled partially out of its frame for receiving beverage cans.
Figure 2:
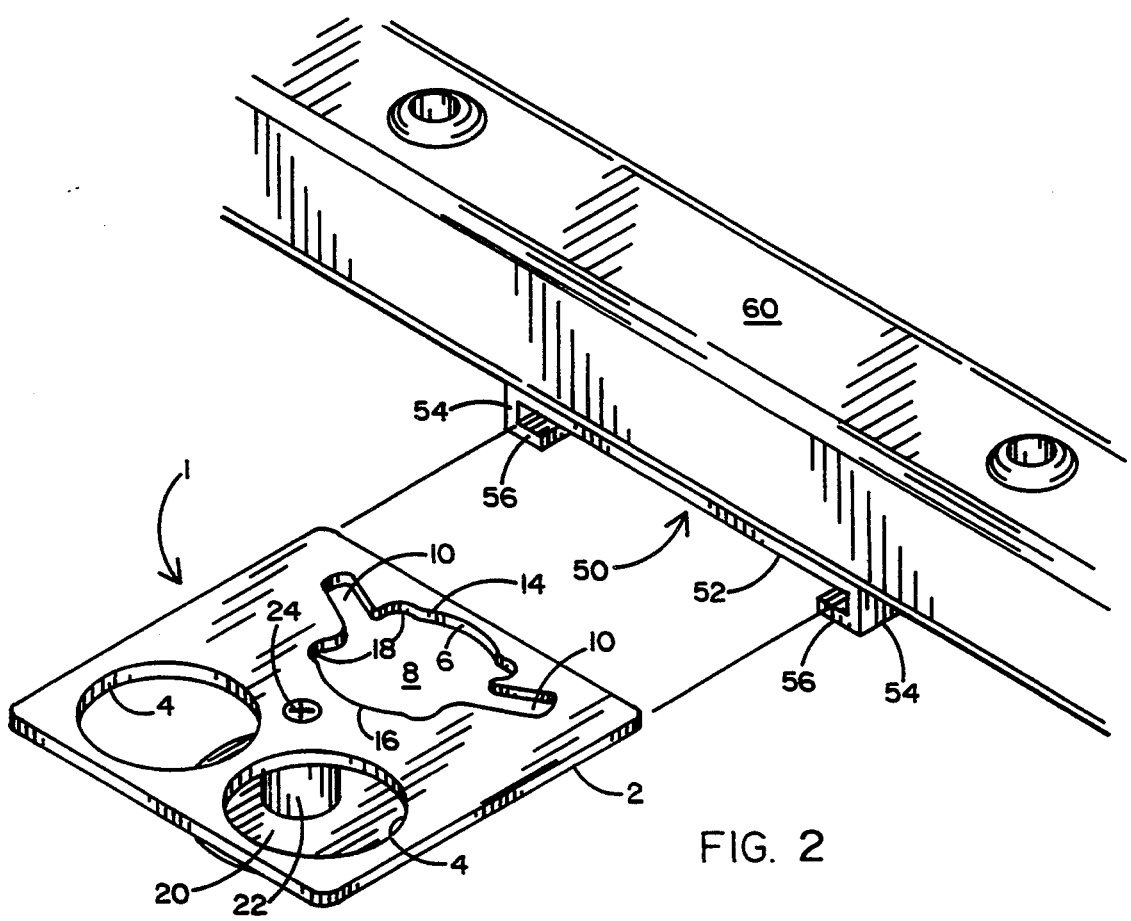
FIG. 2 shows the base plate of FIG. 1 pulled completely out of its frame.

The pull out cup and can holder 1 which forms the present invention is now described in detail while referring concurrently to FIGS. 1-7 of the drawings. The cup and can holder 1 includes a flat, rectangular base plate 2. A pair of round holes 4 are formed through a first end of the base plate 2. Each hole 4 has a particular diameter so as to be adapted to receive therethrough and restrain therewithin a conventional can (shown in phantom in FIGS. 1, 4 and 5 and designated by the reference numeral 30). By way of example, such a can 30 may contain a cold beverage including beer, soft drinks, and the like. In addition, the holes 4 may also receive tall glasses (not shown). Although a pair of holes 4 are formed through base plate 2 to receive respective cans 30, it is also within the scope of this invention for base plate 2 to have more or less than two holes depending upon the size of the plate and the number of cans which are to be received and restrained at the first end thereof.

An opening 6 is formed through the end of base plate 2 opposite the end at which the holes 4 are located. The opening 6 includes a central space 8 that communicates with a pair of finger-like spaces 10. The finger-like spaces 10 of opening 6 extend outwardly from the central space 8 and in generally opposite directions from one another. The central space 8 of opening 15 is surrounded by front and rear walls having rounded ridges 14 and 16 formed therein so as to be adapted to receive therethrough and restrain therewithin a conventional cup or mug (shown in phantom in FIGS. 6 and 7 and designated by the reference numeral 40). By way of example, such a cup 40 which typically has a handle 42 projecting from a side thereof, may contain a hot beverage including coffee, soup, and the like. With the cylinder of the cup 40 received in the central space 8 and against the rounded ridges 14 and 16 in the walls thereof, the handle 42 of the cup will be seated within one of the finger-like spaces 10 depending upon the position and/or the wishes of the user. Thus, and by virtue of the projections 10, the alignment of the cup 40 in opening 6 will be conveniently maintained even when the vehicle, to which the base plate 2 of cup and can holder 1 is mounted, is subjected to vibration and other mechanical forces. Although the opening 6 through base plate 2 has been described as supporting a cup or a mug 40 having a handle 42, it is also possible to restrain within the opening 6 a relatively wide glass with or without a handle (not shown). What is more, the corners 18 of the walls surrounding the central space 8 of opening 6 are relatively square to permit the opening 6 to receive and retain containers having rectangular configurations such as a milk carton (also not shown).

To prevent the can 30 and the cup 40 from dropping completely through the respective holes 4 and opening 6 in which they are received at opposite ends of the base plate 2, a rest 20 is located below the base plate 4 of the cup and can holder 1 beneath the holes 4 and opening 6. Although the rest 20 is illustrated as being round, this is for purpose of convenience only. That is, the rest 20 may have other shapes, provided that the rest will lie under at least some portion of each of the holes 4 and opening 6 in the base plate 2 so as to be able to engage and support any can 30 or cup 40 received therein. In this regard, the rest 20 is held below the base plate 2 in spaced alignment with the holes 4 and the opening 6 by means of a spacer 22. A first screw 24 extends through a screw hole 26 (best shown in FIG. 3) in the base plate 2 and into one end of the spacer 22. A second screw (not shown) extends through a screw hole 28 (also shown in FIG. 3) in the rest 20 and into the opposite end of the spacer 22.

By virtue of the rest 20, each can 30 or cup 40 that is received in a respective hole 4 or opening 6 in the base plate 2 of cup and can holder 1 will be blocked from falling completely through its hole or opening. The distance between the rest 20 and the bottom of the base plate 2 is determined by the length of the spacer 22. To this end, the length of the spacer 22 (preferably about two inches) is selected so that enough of the can 30 and/or the cup 40 will extend about the top of the base plate 2 to permit such can or cup to be easily grasped and quickly removed therefrom.

Figure 3:
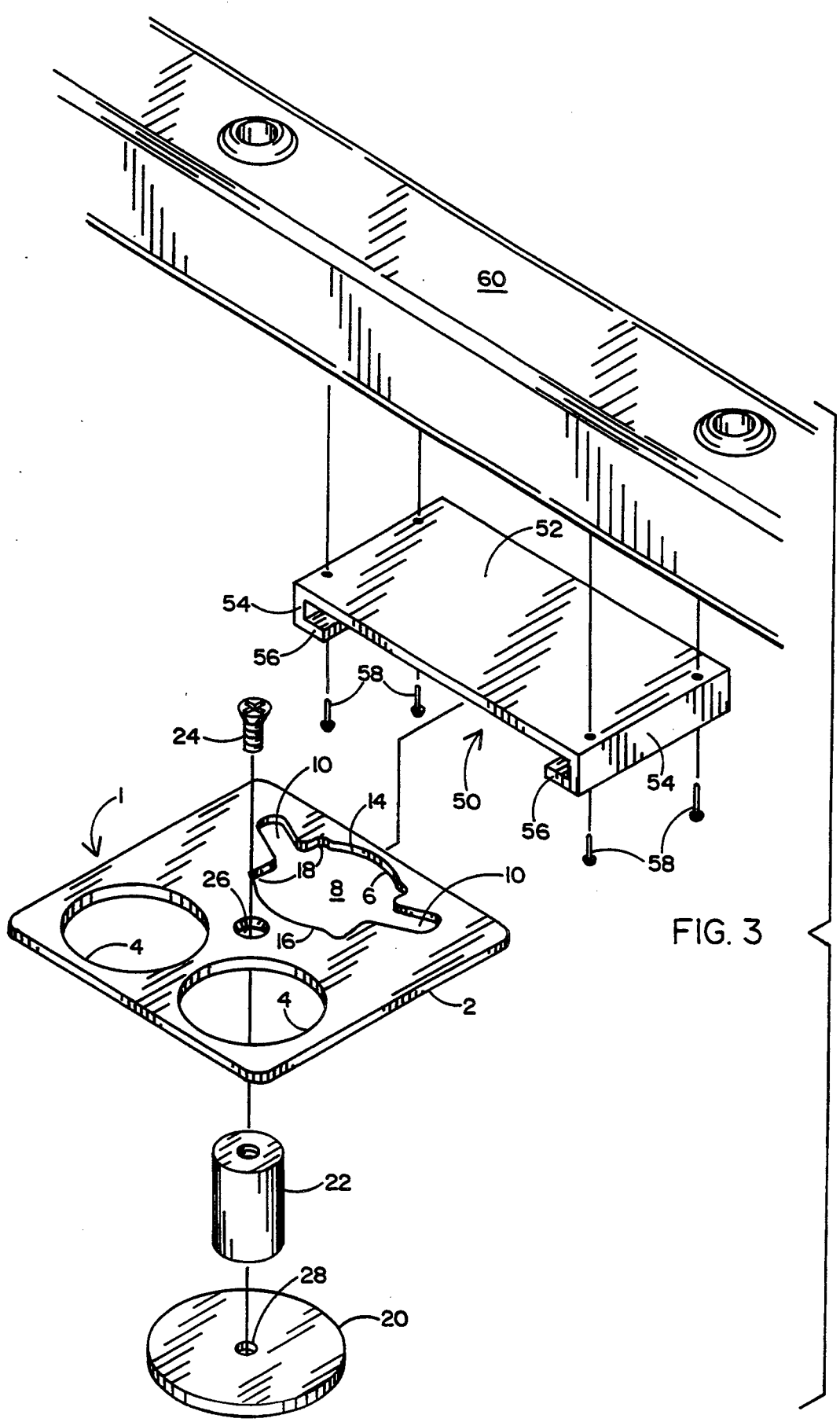
FIG. 3 is an exploded view of the cup and can holder and the frame of FIG. 1.

The cup and can holder 1 of this invention is attached to the interior of a vehicle (e.g. a boat) by means of a frame 50. More particularly, and as best shown in FIG. 3, the frame 50 includes a flat support plate 52. A pair of sidewalls 54 turn downwardly from opposite sides of the support plate 52 of frame 50, and a pair of guide lips 56 turn inwardly towards one another from the side walls 54. Thus, the side walls 54 cooperate with the lips 56 to form opposing channels for slidably receiving and guiding the base plate 2 of the cup and plate holder 1 into and out of the frame 50.

The support plate 52 of frame 50 is mounted to the bottom of any suitable flat surface 60 of the vehicle. By way of example, the flat surface 60 to which the frame 50 is attached may be a table, a counter or even the bottom of a cupboard. A plurality of fasteners 58 (best shown in FIG. 3) are used to secure the support plate 52 to the underside of the surface 60. In the assembled configuration, the spacer 22, to which the rest 20 is attached, projects downwardly below the frame 50 through the space between the opposing lips 56 thereof.

The base plate 2 of cup and can holder 1 may be pushed inwardly through the frame 50 to lie completely below the flat surface 60. In this manner, the cup and can holder 1 will be hidden from view. When it is desirable to place a can 30 or a cup 40 within the cup and can holder 1, the base plate 2 is pulled partially out of the frame 50 (best shown in FIGS. 5 and 7) until the holes 4 or opening 6 at the forward end of the base plate 2 are exposed. The base plate 2 may be pulled completely out of the frame 50 in the event that the forward end of the base plate 2 is not suitable for receiving the desired can or cup. That is to say, the base plate 2 may be removed from the frame 50 and rotated by 180 degrees, whereby to relocate the holes 4 or opening 6 to the forward end thereof, as is needed. The base plate 2 is then returned to the frame 50 so as to be ready to receive a can 30 or a cup 40 according to the wishes of the user.

It will be apparent that while a preferred embodiment of the invention has been shown and described, various modifications and changes may be made without departing from the true spirit and scope of the invention. For example, although the vehicle to which the cup and can holder 1 of this invention is to be mounted has been described as being a boat, this is for example only, and it is to be understood that the frame 50 for slidably receiving the base plate 2 of the cup and can holder 1 may be mounted within any passenger vehicle that is subjected to turbulence such as, but not limited to, an airplane, an automobile, and the like.

Having thus set forth a preferred embodiment of the present invention, what is claimed is:

1. In combination:
    a cup and can holder comprising a base plate having a first end and an opposite end, a first opening having a first size to receive a can and formed through the first end of said base plate, and a second opening having a different size to receive a cup and formed through said opposite end; and
    frame means adapted to be mounted on a substantially horizontal support surface and slidably and removably receive the base plate of said can and cup holder below said frame means, said base plate being slidable partially out of said frame means to expose either the first end of said base plate and said first opening for receiving the can or the second end of said base plate and said second opening for receiving the cup depending upon whether the first or opposite end of said base plate slides out of said frame means, and said base plate being slidable completely out of and removed from said frame means so that said base plate can be returned to said frame means with the first and opposite ends of said base plate reversed with respect to said frame means.

2. The combination recited in claim 1, wherein said frame means includes a support plate and a pair of guide lips depending downwardly from said support plate for slidably receiving said base plate of said cup and can holder below said support plate.

3. The combination recited in claim 1, wherein said first opening for receiving a can has a circular configuration.

4. The combination recited in claim 1, wherein said second opening is adapted to receive a cup having a handle, said second opening having a configuration including a central space for receiving the cylinder of the cup and a finger-like space projecting outwardly from said central opening for receiving the handle of the cup.

5. The combination recited in claim 4, wherein there are a pair of finger-like spaces projecting outwardly from said central space of said second opening in substantially opposite directions from one another, the handle of the cup being located in one of said finger-like spaces.

6. The combination recited in claim 1, further including rest means spaced from said base plate of said cup and can holder and located below at least some of said first and second openings in said base plate to block a can or a cup received in said first or second openings from falling completely therethrough.

7. The combination recited, in claim 6, further including a spacer connected between said base plate and said rest means to space said rest means from said base plate.

8. The combination recited in claim 7, wherein said spacer extends from said base plate and outwardly of said frame means in which said base plate is slidably received.

* * * * *